(12) United States Patent
Ellwein et al.

(10) Patent No.: US 10,214,188 B2
(45) Date of Patent: Feb. 26, 2019

(54) CONTROL APPARATUS FOR HYDRAULIC COMPONENTS OF A BRAKING SYSTEM OF A VEHICLE, AND METHOD FOR EXECUTING AN ANTILOCK BRAKING FUNCTION AT AT LEAST ONE WHEEL BRAKE CYLINDER OF A VEHICLE

(71) Applicant: Robert Bosch GmbH, Stuttgart (DE)

(72) Inventors: Rolf Ellwein, Sachsenheim (DE); Urs Bauer, Sachsenheim (DE); Bertram Foitzik, Ilsfeld (DE); Otmar Bussmann, Abstatt (DE); Matthias Kistner, Bretzfeld (DE); Robert Kaster, White Lake, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 238 days.

(21) Appl. No.: 15/061,691

(22) Filed: Mar. 4, 2016

(65) Prior Publication Data
US 2016/0272175 A1 Sep. 22, 2016

(30) Foreign Application Priority Data

Mar. 18, 2015 (DE) .................. 10 2015 204 877

(51) Int. Cl.
| *B60T 7/04* | (2006.01) |
| *B60T 8/88* | (2006.01) |
| *B60T 13/74* | (2006.01) |
| *B60T 13/66* | (2006.01) |
| *B60T 13/14* | (2006.01) |

(Continued)

(52) U.S. Cl.
CPC .............. *B60T 7/042* (2013.01); *B60T 8/885* (2013.01); *B60T 13/146* (2013.01); *B60T 13/662* (2013.01); *B60T 13/686* (2013.01); *B60T 13/745* (2013.01); *B60T 8/4081* (2013.01); *B60T 2270/402* (2013.01)

(58) Field of Classification Search
CPC ........ B60T 7/042; B60T 8/885; B60T 8/4081; B60T 13/146; B60T 13/662; B60T 13/686; B60T 13/745; B60T 2270/402
See application file for complete search history.

(56) References Cited

U.S. PATENT DOCUMENTS 6,290,310 B1 * 9/2001 Kusano .................... B60T 7/06
303/113.4
2012/0256478 A1 * 10/2012 Druckenmueller ..... B60T 7/042
303/10

* cited by examiner

*Primary Examiner* — Jelani A Smith
*Assistant Examiner* — Kelly D Williams
(74) *Attorney, Agent, or Firm* — Norton Rose Fulbright US LLP; Gerard Messina

(57) ABSTRACT

A control apparatus for hydraulic components of a braking system of a vehicle, having a control application device that is designed to establish by application of control to the hydraulic components, in consideration of the braking request, at least one brake pressure in at least one wheel brake cylinder in such a way that the braking request is satisfiable; and to execute an antilock braking function at the at least one wheel brake cylinder, the control application device additionally being designed to ascertain whether at least one furnished actual value with regard to a displacement travel (s) of a brake actuation element of the vehicle out of its initial position, and/or with regard to a simulator volume shifted out of a brake master cylinder of the vehicle into a linked simulator, lies within at least one predefined extreme value range.

15 Claims, 3 Drawing Sheets

(51) Int. Cl.
*B60T 13/68* (2006.01)
*B60T 8/40* (2006.01)

(Existing Art)

CONTROL APPARATUS FOR HYDRAULIC COMPONENTS OF A BRAKING SYSTEM OF A VEHICLE, AND METHOD FOR EXECUTING AN ANTILOCK BRAKING FUNCTION AT AT LEAST ONE WHEEL BRAKE CYLINDER OF A VEHICLE

CROSS REFERENCE

The present application claims the benefit under 35 U.S.C. § 119 of German Patent Application 102015204877.2 filed on Mar. 18, 2015, which is expressly incorporated herein by reference in its entirety.

FIELD

The present invention relates to a control apparatus for hydraulic components of a braking system of a vehicle. The invention likewise relates to a braking system for a vehicle. The invention furthermore relates to a method for executing an antilock braking function at at least one wheel brake cylinder of a vehicle.

BACKGROUND INFORMATION

FIG. 1 schematically depicts a conventional braking system.

The braking system, schematically depicted in FIG. 1, for a vehicle has a brake master cylinder 10 having a first pressure chamber that encompasses as a brake application volume a first partial volume 12a and a second partial volume 12b. Partial volumes 12a and 12b are reducible by way of the associated piston walls of a displaceable plunger piston 14. Brake master cylinder 10 furthermore also has a second pressure chamber 16 and a displaceable float piston 18. First partial volume 12a, second partial volume 12b, and second pressure chamber 16 are each connected via a breather orifice to a brake fluid reservoir 20.

The braking system of FIG. 1 also has a first brake circuit 24 linked via a first isolation valve 22a to first partial volume 12a and having first wheel brake cylinders 26, and a second brake circuit 28 linked via a second isolation valve 22b to second pressure chamber 16 and having second wheel brake cylinders 30. Each wheel brake cylinder 26 and 30 has one wheel inlet valve 32 and one wheel outlet valve 34 associated with it.

Second partial volume 12b is furthermore linked via a check valve 36 to first brake circuit 24. In addition, second partial volume 12b is linked to brake fluid reservoir 20 both via an electrically controllable valve 38 and via a regulated check valve 40.

The conventional braking system also encompasses a piston-cylinder assemblage 42 whose pressure chamber 44 is delimited by a piston 48 displaceable by operation of a motor 46. Pressure chamber 44 of piston-cylinder assemblage 42 is connected via a third isolation valve 50a to first brake circuit 24, and via a fourth isolation valve 50b to second brake circuit 28. Pressure chamber 44 of piston-cylinder assemblage 42 is moreover hydraulically linked to brake fluid reservoir 20.

The conventional braking system furthermore encompasses a simulator device 52 that is hydraulically linked via a simulator valve 54 to first partial volume 12a. An admission pressure sensor 56a is also linked to first brake circuit 24 in such a way that admission pressure sensor 56a precedes simulator valve 54. One respective brake pressure sensor 56b is additionally linked to each brake circuit 24 and 26. The braking system also has brake actuation sensors 60 for ascertaining an actuation intensity of an actuation by a driver of a brake actuation element 58 of the braking system.

The above-described hydraulic components of the braking system of FIG. 1 can have control applied to them by way of a control apparatus (not depicted). For example, by application of control to the hydraulic components, at least one brake pressure present in wheel brake cylinders 26 and 30 can be establishable in accordance with a predefined normal braking request/brake pressure correlation in such a way that the respective brake pressure corresponds to a braking request of the driver expressed by way of the actuation of brake actuation element 58. An antilock braking function can also be executable at at least one of wheel brake cylinders 26 and 30 by application of control to the hydraulic components of the braking system of FIG. 1.

SUMMARY

The present invention provides a control apparatus for hydraulic components of a braking system of a vehicle, a braking system for a vehicle, and a method for executing an antilock braking function at at least one wheel brake cylinder of a vehicle.

By way of the present invention, it is possible to ensure that the braking system used is still transitionable to the fallback level even in the context of a comparatively long displacement travel of the brake actuation element out of its (unactuated) initial position and/or even in the context of a relatively large simulator volume shifted into the simulator, while still ensuring good usability of the braking system for decelerating its vehicle. Even if an electrical system of the vehicle equipped with the respective braking system fails, when the braking system is at its fallback level it is still possible to ensure, by way of the brake fluid volume shifted into the brake master cylinder, that the driver can force the brake fluid volume, by way of his or her driver braking force, out of the brake master cylinder into the at least one wheel brake cylinder. The driver can thus still reliably effect deceleration of his or her vehicle by way of his or her driver braking force. The present invention thus contributes to improving an operating convenience and safety standard of braking systems for vehicles.

The present invention is advantageous above all for a braking system having the simulator linked to the brake master cylinder. It is noted, however, that the implementability or usability of the present invention is not limited to this type of braking system.

In particular, the displacement travel of the brake actuation element out of its initial position can be reduced as a result of the brake fluid volume transferred into the brake master cylinder. It is thus possible to ensure by way of the reduced displacement travel of the brake actuation element, even during execution of the antilock braking function, that even in the context of a sudden transition of the braking system to its fallback level, the driver can implement a sufficiently long maximum displacement travel of the brake actuation element for reliable deceleration of his or her vehicle.

For example, at least one motorized piston-cylinder apparatus of the braking system and/or at least one pump of the braking system can have control applied to them by way of the control application device, as at least some of the hydraulic components, in such a way that the brake fluid volume is transferred out of the at least one wheel brake cylinder and/or the at least one reservoir device into the brake master cylinder. It is thus possible to use inexpensive hydraulic components, to which control can reliably be applied, in order to bring about the desired shift of the brake fluid volume into the brake master cylinder. The present invention can furthermore draw upon hardware components that generally are already installed on a braking system. Supplementation of the hydraulic components of the braking system is thus not required in order to carry out the present invention. The control apparatus can therefore be used together with an inexpensive braking system that requires comparatively little installation space.

In an advantageous refinement, a target value of the brake fluid volume transferred into the brake master cylinder is definable by way of the control application device in consideration of a wheel brake cylinder volume present in the at least one wheel brake cylinder and/or of the brake pressure present in the at least one wheel brake cylinder. An optimization of the brake fluid volume transferred into the brake master cylinder, in terms of the wheel brake cylinder volume and/or of the brake pressure in the at least one wheel brake cylinder, is therefore achievable.

The advantages described above are also created in the context of a braking system for a vehicle having a control apparatus of this kind.

The corresponding method for executing an antilock braking function at at least one wheel brake cylinder of a vehicle furthermore also achieves the above-described advantages. It is noted that the method can be further developed in accordance with the various embodiments of the control apparatus.

BRIEF DESCRIPTION OF THE DRAWINGS

Further features and advantages of the present invention are explained below with reference to the Figures.

DETAILED DESCRIPTION OF EXAMPLE EMBODIMENTS

Figure 2:
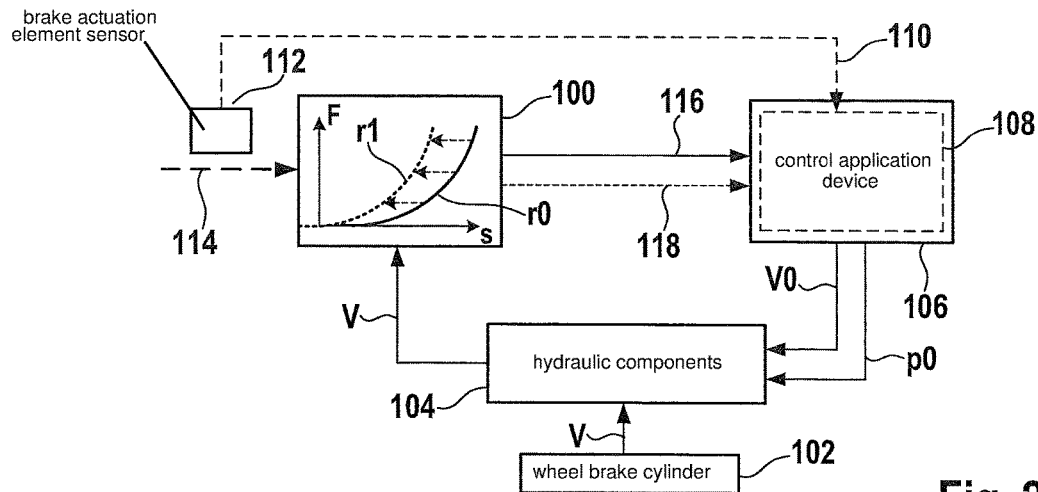
FIG. 2 is a block diagram to explain a manner of operation of a braking system, equipped with a first embodiment of the control apparatus, of a vehicle.

FIG. 2 is a block diagram to explain a manner of operation of a braking system, equipped with a first embodiment of the control apparatus, of a vehicle.

The braking system schematically reproduced by way of FIG. 2 also encompasses, in addition to a brake master cylinder 100 and at least one wheel brake cylinder 102, further hydraulic components 104. For example, the braking system can encompass as its hydraulic components 104 at least one electrically controllable or switchable valve, for example at least one isolation valve, at least one wheel inlet valve, and/or at least one wheel outlet valve, at least one pump, and/or at least one piston-cylinder apparatus (the pressure chamber of which is delimited by a piston linearly displaceable by operation of a motor). The exemplifying embodiments enumerated here for hydraulic components 104 are, however, to be interpreted merely as examples. In particular, the braking system can be identical to the braking system schematically depicted in FIG. 1.

Figure 1:
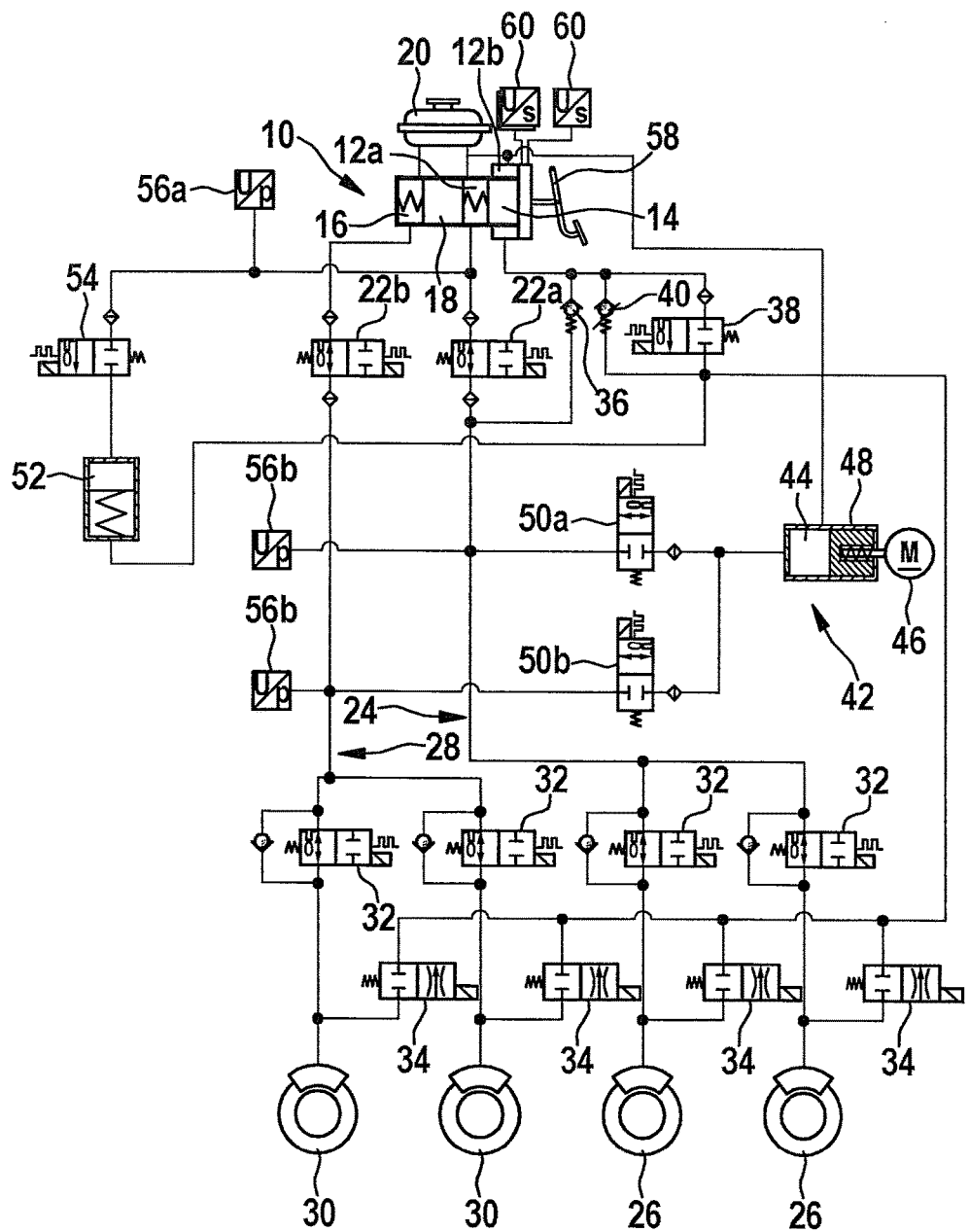
FIG. 1 schematically depicts a conventional braking system.

It is noted, however, that usability of a control apparatus 106 described hereinafter is not limited to a specific braking system configuration or to the outfitting of the braking system with the type of brake master cylinder depicted in FIG. 1, or with specific components 104. Control apparatus 106 is instead usable for a plurality of different types of braking system. The vehicle or motor vehicle outfitted with control apparatus 106 and with the braking system is also not limited to a specific type of vehicle or motor vehicle.

Control apparatus 106 can furthermore be designed for different numbers of wheel brake cylinders 102. An accurate reproduction of the number of wheel brake cylinders 102 in the braking system of FIG. 2 is therefore omitted. Merely by way of example, four wheel brake cylinders 102 can be installed in the braking system.

Control apparatus 106 has a control application device 108 that is designed to detect, on the basis of a furnished braking request signal 110, a braking request of a driver of the vehicle. The at least one furnished braking request signal 110 can be outputtable to control apparatus 106, for example, by at least one brake actuation element sensor 112. Preferably the at least one braking request signal 110 corresponds to an actuation intensity of an actuation 114 by the driver of a brake actuation element (brake pedal) (not depicted), by way of which actuation the driver applies braking action to brake master cylinder 100. The at least one brake actuation element sensor 112 can be, for example, a brake travel sensor, such as in particular a brake pedal sensor and/or a plunger travel sensor. Other types of sensors can also be used to furnish the at least one braking request signal 110 to control apparatus 106.

Hydraulic components 104 can be operated or have control applied to them by way of control application device 108, in consideration of the braking request, in such a way that (by way of a corresponding operation of hydraulic components 104 to which control is applied) at least one brake pressure can be established in the at least one wheel brake cylinder 102 of the braking system in such a way that the braking request can be satisfied by a total braking torque made up at least of at least one wheel brake cylinder braking torque of the at least one wheel brake cylinder 102 of the braking system. This can be understood to mean, for example, that the total braking torque corresponds to a predefined braking request/braking torque correlation as a function of the braking request. In addition to the at least one wheel brake cylinder braking torque of the at least one wheel brake cylinder 102 of the braking system, at least one generator braking torque of at least one electric motor (usable for regenerative braking) of the vehicle can also constitute part of the total braking torque.

Control application device 108 is furthermore designed to execute, by application of control to hydraulic component 104, an antilock braking function (ABS operation or ABS function) at the at least one wheel brake cylinder 102. The antilock braking function can be executed by the fact that the respective brake pressure in the at least one wheel brake cylinder 102 is held constant or reduced, despite the higher braking request in relation to the respective brake pressure, in such a way that the braking request is satisfied only partially by the total braking torque made up at least of the at least one wheel brake cylinder braking torque of the at least one wheel brake cylinder 102 of the braking system (and possibly of the at least one generator braking torque). The total braking torque is thus lower than a value corresponding to the predefined braking request/braking torque correlation as a function of the braking request. It is noted that a plurality of conventional antilock braking functions can be executable by way of control application device 108 by application of control to hydraulic components 104. Control application device 108 is thus not limited to executing a specific antilock braking function. Because antilock braking functions are conventional, they will not be discussed in further detail here.

In the embodiment of FIG. 2, control application device 108 defines, in consideration at least of the braking request or braking request signal 110, a target brake pressure p0 for the at least one wheel brake cylinder 102; the target brake pressure p0 defined for the at least one wheel brake cylinder 102 can be a collective target brake pressure p0 of all wheel brake cylinders 102, an axle-specific target brake pressure p0 of wheel brake cylinders 102, or an individual-wheel target brake pressure p0 of wheel brake cylinders 102. The target brake pressure p0 of the at least one wheel brake cylinder 102 for executing the antilock braking function can be defined in particular so that the resulting total braking torque, made up at least of the at least one wheel brake cylinder braking torque of the at least one wheel brake cylinder 102 of the braking system (and possibly of the at least one generator braking torque) is lower than the braking request, while otherwise the target brake pressure p0 of the at least one wheel brake cylinder 102 is defined so that the resulting total braking torque (completely) satisfies the braking request. Control application device 108 then outputs the target brake pressure p0 of the at least one wheel brake cylinder 102 to a control unit (not depicted) of hydraulic components 104, which correspondingly operates or applies control to hydraulic components 104 in accordance with the target brake pressure p0, defined by control application device 108, of the at least one wheel brake cylinder 102. As an alternative thereto, however, control application device 108 can also be embodied to apply control directly to hydraulic components 104.

In the embodiment of FIG. 2, a simulator (not depicted) is linked to brake master cylinder 100 of the vehicle. (The simulator can, for example, be linked via a simulator valve to brake master cylinder 100 as depicted in FIG. 1.) The driver can thus shift brake fluid between brake master cylinder 100 and the simulator linked thereto, with the result that (for example by corresponding application of control to the simulator valve) a preferred correlation r0 (normal correlation) between a displacement travel s (pedal travel) of its brake actuation element (brake pedal) and its driver braking force F exerted on the brake actuation element can be maintained despite a decoupling of the at least one wheel brake cylinder 102 from brake master cylinder 100. The at least one brake pressure present in the at least one wheel brake cylinder 102 can thus be established (for example at the at least one previously target brake pressure p0) but the driver perceives no direct force feedback upon actuation 114 of the brake actuation element. (This can be used in particular to blend in the at least one generator braking torque by correspondingly varying the at least one wheel cylinder braking torque of the at least one wheel brake cylinder 102 of the braking system.)

Control application device 108 is additionally designed to receive at least one furnished actual value 116 and 118 with regard to the displacement travel s of the brake actuation element out of its (unactuated) initial position, and/or with regard to a simulator volume shifted out of brake master cylinder 100 into the linked simulator. Control application device 108 is then designed to ascertain whether the at least one furnished actual value 116 and 118 is within at least one predefined extreme value range. If the at least one furnished actual value 116 and 118 is within the at least one extreme value range, control application device 108 is designed to transfer a brake fluid volume V out of the at least one wheel brake cylinder 102 and/or at least one reservoir device into brake master cylinder 100 by applying control to hydraulic components 104 during the antilock braking function executed simultaneously or thereafter by said device. Control application device 108 is designed especially to ensure, if the at least one furnished actual value 116 and 118 is within the at least one extreme value range, that the transfer of the brake fluid volume V into brake master cylinder 100 occurs during the respective antilock braking function. The brake fluid volume V is thus transferred into brake master cylinder 100 while the resulting total braking torque, made up at least of the at least one wheel brake cylinder braking torque of the at least one wheel brake cylinder 102 of the braking system (and possibly of the at least one generator braking torque) is lower than the braking request. In the embodiment of FIG. 2 this happens by the fact that a target brake fluid volume V0 (target value of the brake fluid volume V) is outputted to the control unit of hydraulic components 104.

It is possible in this manner to ensure that the braking system operated by way of control apparatus 106 is still transitionable to its fallback level, even within an antilock braking function executed in the context of an intense actuation 114 of the brake actuation element, in such a way that the driver can bring about, by way of his or her driver braking force F, a (further) brake pressure buildup in the at least one wheel brake cylinder 102. Because of the brake fluid volume V displaced in brake master cylinder 100 there is assurance, despite an intense actuation 114 of the brake actuation element and/or of a comparably large simulator volume, that after transition to the fallback level, sufficient brake fluid is still present in brake master cylinder 100 for application by the driver of braking action to the at least one wheel brake cylinder 102. A high safety standard for the braking system thus still exists even in the context of a sudden transition to its fallback level during an antilock braking function executed in the context of an intense actuation of the brake actuation element. Good braking convenience for the driver is also enabled, since in such a situation he or she him- or herself can still apply braking action to the at least one wheel brake cylinder 102 by way of his or her driver braking force F. Even a sudden failure of an electrical system of the vehicle can therefore still be acceptably and reliably circumvented in a critical situation of this kind.

The extreme value range for the at least one furnished actual value 116 and 118 is preferably respectively defined in such a way that an actual value 116 or 118 lying within the respective extreme value range occurs (as a rule) only in the context of a comparatively intense actuation 114 of the brake actuation element and/or in the context of a relatively large simulator volume. In the embodiment of FIG. 2, a first actual value 116 is the displacement travel s of the brake actuation element. The associated extreme value range can thus lie above a predefined limit displacement travel of the brake actuation element. A second actual value 118 is a simulator pressure (correlating with the simulator volume) inside or at the simulator. In this case the associated extreme value range can lie above a predefined limit simulator pressure. The examples enumerated here for the at least one actual value 116 and 118, and the extreme value range that can be associated, are to be understood, however, merely as examples.

For example, at least one motorized piston-cylinder apparatus of the braking system, and/or at least one pump of the braking system, can have control applied to it by way of control application device 108, as at least some of hydraulic components 104, in such a way that the brake fluid volume V is transferred out of the at least one wheel brake cylinder 102 and/or the at least one reservoir device into brake master cylinder 100. Inexpensive components can thus be used to execute the desired displacement of the brake fluid volume V into brake master cylinder 100. The brake fluid volume V can be displaced directly out of the at least one wheel brake cylinder 102 into brake master cylinder 100. A reduction, thereby triggered, in the at least one brake pressure can thus be used to (partially) execute the antilock braking function. Alternatively, however, the brake fluid volume V can also be displaceable out of a reservoir device 102 (for example a reservoir chamber or low-pressure reservoir chamber linked to the at least one wheel brake cylinder 102, or the pressure chamber of the piston-cylinder device) into brake master cylinder 100.

Preferably, the displacement travel s of the brake actuation element out of its initial position is reducible (during the respective antilock braking function) by way of the brake fluid volume V transferred into brake master cylinder 100. This creates an active backward shift of the brake actuation element (during the respective antilock braking function). It is thereby possible to ensure that even in the context of a sudden transition of his or her braking system to its fallback level, the driver still has the capability for sufficient actuation of his or her brake actuation element.

By way of the active backward shift of the brake actuation element it is possible in particular to create a fallback correlation r1, desired for the fallback level, between the driver braking force F exerted on the brake actuation element and the displacement travel s of the brake actuation element, which correlation ensures a harder or stiffer characteristic of the brake actuation element as compared with the correlation r0 (normal correlation). For example, the driver can apply braking action onto a harder brake pedal during an antilock braking function. This permits an embodiment of brake master cylinder 100 with a reduced brake master cylinder diameter, sufficient brake fluid for displacement into the at least one wheel brake cylinder 102 by way of the driver braking force F nevertheless being available after the transition of the braking system to its fallback level.

Figure 3:
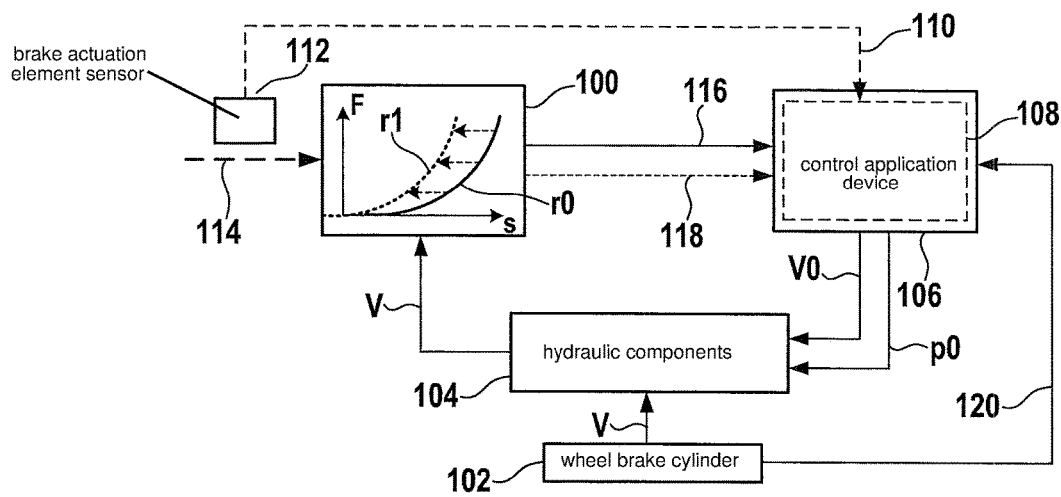
FIG. 3 is a block diagram to explain a manner of operation of a braking system, equipped with a second embodiment of the control apparatus, of a vehicle.

FIG. 3 is a block diagram to explain a manner of operation of a braking system, equipped with a second embodiment of the control apparatus, of a vehicle.

The embodiment reproduced by way of FIG. 3 can exhibit all the features or properties of control apparatus 106 described previously. Control apparatus 106 of FIG. 3 furthermore has a control application device 108 with which a target value V0 of the brake fluid volume V transferred into brake master cylinder 100 is definable in consideration of a wheel brake cylinder volume present in the at least one wheel brake cylinder 102 and/or of the brake pressure existing in the at least one wheel brake cylinder 102. A signal 120 with regard to the wheel brake cylinder volume present in the at least one wheel brake cylinder 102 and/or with regard to the brake pressure present in the at least one wheel brake cylinder 102 can be furnished to control application device 108. Once the target value V0 has been defined in additional consideration of the signal 120, control can be applied to hydraulic components 104 in such a way that the brake fluid volume V displaced into brake master cylinder 100 corresponds to the target value V0.

Figure 4:
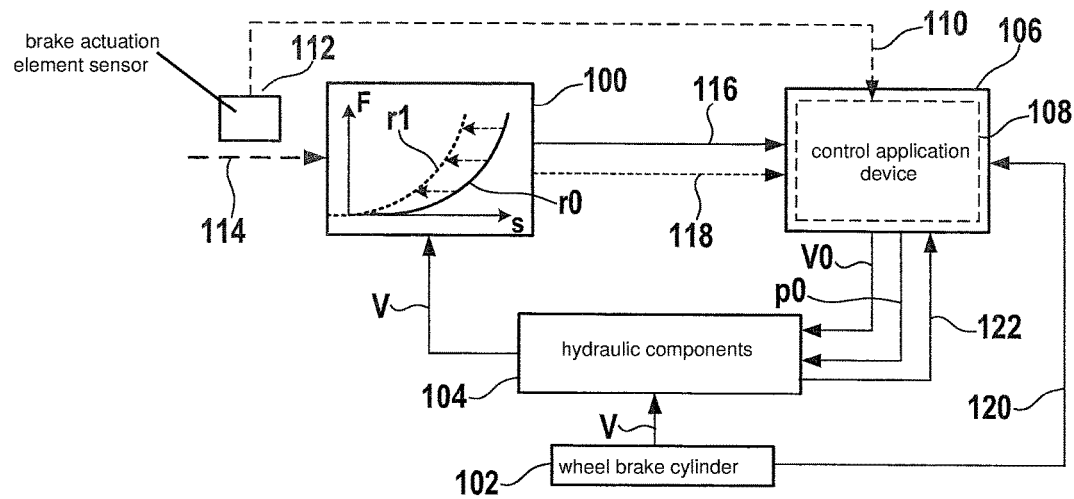
FIG. 4 is a block diagram to explain a manner of operation of a braking system, equipped with a third embodiment of the control apparatus, of a vehicle.

FIG. 4 is a block diagram to explain a manner of operation of a braking system, equipped with a third embodiment of the control apparatus, of a vehicle.

The embodiment reproduced by way of FIG. 4 can also exhibit all the features or properties of control apparatus 106 of FIG. 3. As an optional refinement, control application device 108 is also designed to receive, from the control unit of hydraulic components 104, an output signal 122 by way of which the control unit indicates current execution of an antilock braking function. It is thereby possible to ensure that a displacement of the brake fluid volume V into brake master cylinder 100 occurs only during current execution of the antilock braking function.

All of the above-described control apparatuses 106 create a mitigation of the volume situation and an enhanced level of robustness for antilock braking functions. In particular, during a vehicle electrical system failure occurring within an antilock braking function, there is no longer the problem that the driver has already pushed his or her brake actuation element sufficiently far that after the failure, he or she can now transfer very little volume to the at least one wheel brake cylinder 102. The advantages of control apparatuses 106 are also ensured in the context of a braking system for a vehicle having a control apparatus 106 of this kind.

Figure 5:
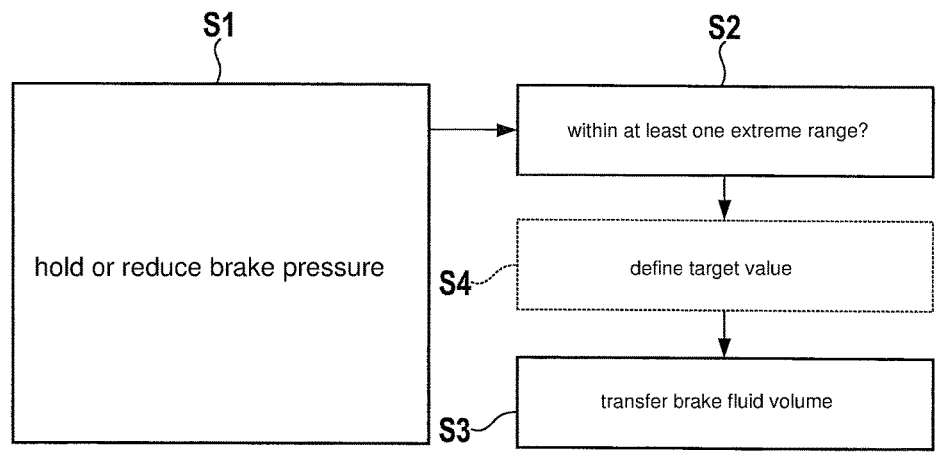
FIG. 5 is a flow chart to explain an embodiment of the method for executing an antilock braking function at at least one wheel brake cylinder of a vehicle.

FIG. 5 is a flow chart to explain an embodiment of the method for executing an antilock braking function at at least one wheel brake cylinder of a vehicle.

The method described below can be executed, for example, with the braking system of FIG. 1. It is noted, however, that an implementability of the method is not limited either to a specific braking system configuration or to a particular type of brake master cylinder, or to special hydraulic components of the braking system used for it.

In a method step S1 at least one brake pressure in the at least one wheel brake cylinder is held (constant) or reduced despite a braking request of a driver of the vehicle which is higher in relation to the respective brake pressure, with the result that the braking request can be satisfied only in part by a total braking torque made up at least of at least one wheel brake cylinder braking torque of the at least one wheel brake cylinder (and possibly of at least one generator braking torque). (As a rule, during non-execution of an antilock braking function the at least one brake pressure in the at least one wheel brake cylinder of the braking system is adapted to the braking request in such a way that the total braking torque, made up at least of the at least one wheel brake cylinder braking torque of the at least one wheel brake cylinder (and possibly of the at least one generator braking torque) (completely) satisfies the braking request.)

The method also encompasses method steps S2 and S3, of which at least method step S3 is executed during method step S1. Method step S2 ascertains whether at least one actual value with regard to a displacement travel of a brake actuation element of the vehicle out of its initial position, and/or with regard to a simulator volume shifted out of a brake master cylinder of the vehicle into a linked simulator, is within at least one predefined extreme value range. Examples of the at least one actual value, and of pertinent extreme value ranges, have already been recited above. If it is ascertained in method step S2 that the at least one actual value is within the at least one extreme value range, method step S3 is executed. In method step S3 a brake fluid volume is transferred, during the antilock braking function executed simultaneously or thereafter, out of the at least one wheel brake cylinder and/or at least one reservoir device into the brake master cylinder. Method steps S1 to S3 thus also create the advantages described above.

In method step S3, preferably the displacement travel of the brake actuation element out of its initial position is reduced by way of the brake fluid volume transferred into the brake master cylinder. For this, the brake fluid volume can be transferred into the brake master cylinder out of the at least one wheel brake cylinder and/or the at least one reservoir device, for example by way of at least one motorized piston-cylinder apparatus of the braking system and/or at least one pump of the braking system, as at least some of the hydraulic components. The possibilities described here are to be interpreted, however, only as examples.

Optionally the method can also have a method step S4 that is executed before method step S3. In method step S4 a target value of the brake fluid volume transferred into the brake master cylinder is defined in consideration of a wheel brake cylinder volume present in the at least one wheel brake cylinder and/or of the brake pressure present in the at least one wheel brake cylinder. Then, in method step S3, the brake fluid volume corresponding to the defined target value is transferred out of the at least one wheel brake cylinder and/or the at least one reservoir device into the brake master cylinder.

With regard to further possibilities for refining the method described here, reference is made to the embodiments of the control apparatus which are described above.

What is claimed is:

1. A control apparatus for hydraulic components of a braking system of a vehicle, comprising:
   a control device that is configured to:
      detect, on the basis of at least one furnished braking request signal, a braking request of a driver of the vehicle; and
      by application of control to the hydraulic components in consideration of the braking request, at least to set at least one brake pressure in at least one wheel brake cylinder of the braking system in such a way that the braking request is satisfiable by a total braking torque made up at least of at least one wheel brake cylinder braking torque of the at least one wheel brake cylinder; and
      execute an antilock braking function at the at least one wheel brake cylinder by the fact that the at least one brake pressure in the at least one wheel brake cylinder is held constant or reduced, despite the braking request being higher in relation to the at least one brake pressure, in such a way that the braking request is satisfied only partly by the total braking torque;
   wherein the control device is additionally configured to:
      ascertain whether at least one furnished actual value with regard to at least one of: i) a displacement travel of a brake actuation element of the vehicle out of its initial position, and ii) a simulator volume shifted out of a brake master cylinder of the vehicle into a linked simulator, lies within at least one predefined extreme value range, wherein the at least one predefined extreme value range is a range above a predefined limit; and
      based on ascertaining the at least one furnished actual value lies within the at least one predefined extreme value range:
         transfer a brake fluid volume out of at least one of: i) the at least one wheel brake cylinder and ii) at least one reservoir device, and into the brake master cylinder during the antilock braking function by application of control to the hydraulic components, and
         control the brake actuation element by actively moving the brake actuation element toward its initial position to reduce the displacement of the brake actuation element from its initial position.

2. The control apparatus as recited in claim 1, wherein the brake actuation element is actively moved towards its initial position as a result of the brake fluid volume transferred into the brake master cylinder.

3. The control apparatus as recited in claim 1, wherein at least one of: i) at least one motorized piston-cylinder apparatus of the braking system, and ii) at least one pump of the braking system, is capable of having control applied to it by way of the control application device, as at least some of the hydraulic components, in such a way that the brake fluid volume is transferred out of at least one of: i) the at least one wheel brake cylinder and ii) the at least one reservoir device, and into the brake master cylinder.

4. The control apparatus as recited in claim 1, wherein a target value of the brake fluid volume transferred into the brake master cylinder is definable by way of the control application device in consideration of at least one of: i) a wheel brake cylinder volume present in the at least one wheel brake cylinder and ii) of the at least one brake pressure present in the at least one wheel brake cylinder.

5. The control apparatus as recited in claim 1, wherein the at least one actual value is the displacement travel of the brake actuator element of the vehicle out of its initial position, and the predefined limit is a predefined limit displacement travel of the brake actuation element.

6. A braking system for a vehicle, having a control apparatus for hydraulic components of the braking system, the control apparatus comprising:
   a control device that is configured to:
      detect, on the basis of at least one furnished braking request signal, a braking request of a driver of the vehicle; and
      by application of control to the hydraulic components in consideration of the braking request, at least to set at least one brake pressure in at least one wheel brake cylinder of the braking system in such a way that the braking request is satisfiable by a total braking torque made up at least of at least one wheel brake cylinder braking torque of the at least one wheel brake cylinder; and
      execute an antilock braking function at the at least one wheel brake cylinder by the fact that the at least one brake pressure in the at least one wheel brake cylinder is held constant or reduced, despite the braking request being higher in relation to the at least one brake pressure, in such a way that the braking request is satisfied only partly by the total braking torque;
   wherein the control device is additionally configured to:
      ascertain whether at least one furnished actual value with regard to at least one of: i) a displacement travel of a brake actuation element of the vehicle out of its initial position, and ii) a simulator volume shifted out of a brake master cylinder of the vehicle into a linked simulator, lies within at least one predefined extreme value range, wherein the at least one predefined extreme value range is a range above a predefined limit; and
      based on ascertaining the at least one furnished actual value lies within the at least one predefined extreme value range:

transfer a brake fluid volume out of at least one of:
i) the at least one wheel brake cylinder and ii) at least one reservoir device, and into the brake master cylinder during the antilock braking function by application of control to the hydraulic components, and control the brake actuation element by actively moving the brake actuation element toward its initial position to reduce the displacement of the brake actuation element from its initial position.

7. The braking system as recited in claim 6, wherein the at least one actual value is the displacement travel of the brake actuator element of the vehicle out of its initial position, and the predefined limit is a predefined limit displacement travel of the brake actuation element.

8. A method for executing a braking function at at least one wheel brake cylinder of a vehicle, comprising:

executing an antilock braking function including reducing or holding at least one brake pressure in the at least one wheel brake cylinder despite a braking request of a driver of the vehicle which is higher in relation to the at least one brake pressure, resulting in the braking request being satisfied only partly by a total braking torque made up at least of at least one wheel brake cylinder braking torque of the at least one wheel brake cylinder;

ascertaining whether at least one actual value with regard to at least one of: (i) a displacement travel of a brake actuation element of the vehicle out of its initial position, and (ii) a simulator volume shifted out of a brake master cylinder of the vehicle into a linked simulator, lies within at least one predefined extreme value range, wherein the at least one predefined extreme value range is a range above a predefined limit; and based on ascertaining that the at least one actual value lies within the at least one predefined extreme value range:
transferring a brake fluid volume during the antilock braking function out of at least one of: i) the at least one wheel brake cylinder, and ii) at least one reservoir device, and into the brake master cylinder, and
controlling the brake actuation element by actively moving the brake actuation element toward its initial position to reduce the displacement of the brake actuation element from its initial position.

9. The method as recited in claim 8, wherein the brake actuation element is actively moved towards its initial position by way of the brake fluid volume transferred into the brake master cylinder.

10. The method as recited in claim 8, wherein the brake fluid volume is transferred out of at least one of: i) the at least one wheel brake cylinder and ii) the at least one reservoir device, and into the brake master cylinder by way of at least one of: i) at least one motorized piston-cylinder apparatus of the braking system, and ii) at least one pump of the braking system, as at least some hydraulic components of the braking system.

11. The method as recited in claim 8, wherein a target value of the brake fluid volume transferred into the brake master cylinder is defined in consideration of at least one of: i) a wheel brake cylinder volume present in the at least one wheel brake cylinder, and ii) of the at least one brake pressure present in the at least one wheel brake cylinder, and the brake fluid volume corresponding to the defined target value then being transferred out of the at least one of: i) at least one wheel brake cylinder, and ii) the at least one reservoir device, and into the brake master cylinder.

12. The method as recited in claim 8, wherein the at least one actual value is the displacement travel of the brake actuator element of the vehicle out of its initial position, and the predefined limit is a predefined limit displacement travel of the brake actuation element.

13. A control apparatus for hydraulic components of a braking system of a vehicle, comprising:

a control device that is configured to:
detect, on the basis of at least one furnished braking request signal, a braking request of a driver of the vehicle; and
by application of control to the hydraulic components in consideration of the braking request, at least to set at least one brake pressure in at least one wheel brake cylinder of the braking system in such a way that the braking request is satisfiable by a total braking torque made up at least of at least one wheel brake cylinder braking torque of the at least one wheel brake cylinder; and
execute an antilock braking function at the at least one wheel brake cylinder by the fact that the at least one brake pressure in the at least one wheel brake cylinder is held constant or reduced, despite the braking request being higher in relation to the at least one brake pressure, in such a way that the braking request is satisfied only partly by the total braking torque;

wherein the control device is additionally configured to:
ascertain whether at least one furnished actual value with regard to at least one of: i) a displacement travel of a brake actuation element of the vehicle out of its initial position, and ii) a simulator volume shifted out of a brake master cylinder of the vehicle into a linked simulator, lies within at least one predefined extreme value range, wherein the at least one predefined extreme value range is a range above a predefined limit and
based on ascertaining the at least one furnished actual value lies within the at least one predefined extreme value range:
transfer a brake fluid volume out of at least one of: i) the at least one wheel brake cylinder and ii) at least one reservoir device, and into the brake master cylinder during the antilock braking function by application of control to the hydraulic components, and
reduce the displacement of the brake actuation element from its initial position;

wherein the at least one actual value is a simulator pressure inside or at the simulator, and the predefined limit is a predefined limit simulator pressure.

14. A braking system for a vehicle, having a control apparatus for hydraulic components of the braking system, the control apparatus comprising:

a control device that is configured to:
detect, on the basis of at least one furnished braking request signal, a braking request of a driver of the vehicle; and
by application of control to the hydraulic components in consideration of the braking request, at least to set at least one brake pressure in at least one wheel brake cylinder of the braking system in such a way that the braking request is satisfiable by a total braking torque made up at least of at least one wheel brake cylinder braking torque of the at least one wheel brake cylinder; and
execute an antilock braking function at the at least one wheel brake cylinder by the fact that the at least one brake pressure in the at least one wheel brake cylinder is held constant or reduced, despite the braking request being higher in relation to the at least one brake pressure, in such a way that the braking request is satisfied only partly by the total braking torque;

wherein the control device is additionally configured to:
ascertain whether at least one furnished actual value with regard to at least one of: i) a displacement travel of a brake actuation element of the vehicle out of its initial position, and ii) a simulator volume shifted out of a brake master cylinder of the vehicle into a linked simulator, lies within at least one predefined extreme value range, wherein the at least one predefined extreme value range is a range above a predefined limit and based on ascertaining the at least one furnished actual value lies within the at least one predefined extreme value range:
transfer a brake fluid volume out of at least one of: i) the at least one wheel brake cylinder and ii) at least one reservoir device, and into the brake master cylinder during the antilock braking function by application of control to the hydraulic components, and
reduce the displacement of the brake actuation element from its initial position;
wherein the at least one actual value is a simulator pressure inside or at the simulator, and the predefined limit is a predefined limit simulator pressure.

15. A method for executing a braking function at at least one wheel brake cylinder of a vehicle, comprising:

executing an antilock braking function including reducing or holding at least one brake pressure in the at least one wheel brake cylinder despite a braking request of a driver of the vehicle which is higher in relation to the at least one brake pressure, resulting in the braking request being satisfied only partly by a total braking torque made up at least of at least one wheel brake cylinder braking torque of the at least one wheel brake cylinder;

ascertaining whether at least one actual value with regard to at least one of: (i) a displacement travel of a brake actuation element of the vehicle out of its initial position, and (ii) a simulator volume shifted out of a brake master cylinder of the vehicle into a linked simulator, lies within at least one predefined extreme value range, wherein the at least one predefined extreme value range is a range above a predefined limit and based on ascertaining that the at least one actual value lies within the at least one predefined extreme value range:
transferring a brake fluid volume during the antilock braking function out of at least one of: i) the at least one wheel brake cylinder, and ii) at least one reservoir device, and into the brake master cylinder, and
reducing the displacement of the brake actuation element from its initial position;
wherein the at least one actual value is a simulator pressure inside or at the simulator, and the predefined limit is a predefined limit simulator pressure.

* * * * *